US011533715B2

(12) United States Patent
Li et al.

(10) Patent No.: US 11,533,715 B2
(45) Date of Patent: Dec. 20, 2022

(54) RELIABLE LOW LATENCY WIRELESS COMMUNICATIONS

(71) Applicant: QUALCOMM Incorporated, San Diego, CA (US)

(72) Inventors: Junyi Li, Chester, NJ (US); Hua Wang, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 112 days.

(21) Appl. No.: 16/271,159

(22) Filed: Feb. 8, 2019

(65) Prior Publication Data

US 2020/0260415 A1 Aug. 13, 2020

(51) Int. Cl.
*H04W 72/04* (2009.01)
*H04L 1/18* (2006.01)

(52) U.S. Cl.
CPC ............. *H04W 72/042* (2013.01); *H04L 1/18* (2013.01); *H04W 72/0453* (2013.01)

(58) Field of Classification Search
CPC .... H04L 1/18; H04W 72/042; H04W 72/0453
USPC ......................................................... 370/329
See application file for complete search history.

(56) References Cited

U.S. PATENT DOCUMENTS

2010/0272041 A1* 10/2010 Ramakrishna ........ H04L 5/0046
370/329
2011/0310769 A1* 12/2011 Lee ......................... H04W 4/70
370/254
2013/0148616 A1* 6/2013 Takano ............... H04W 72/121
370/329
2014/0177547 A1* 6/2014 Guo ...................... H04L 5/0094
370/329
2016/0021657 A1 1/2016 Chen et al.
2017/0134137 A1 5/2017 Kuchibhotla et al.
2017/0135116 A1* 5/2017 Kuchibhotla ......... H04L 1/1854
2018/0254794 A1* 9/2018 Lee ...................... H04J 11/0069
2019/0007175 A1 1/2019 Kwak et al.
2019/0074936 A1* 3/2019 Lee ....................... H04W 72/14
2019/0253192 A1* 8/2019 Zhou ......................... H04L 1/08

FOREIGN PATENT DOCUMENTS

EP    3447960 A1    2/2019

OTHER PUBLICATIONS

International Search Report and Written Opinion—PCT/US2020/017044—ISAEPO—filed May 4, 2020.

* cited by examiner

*Primary Examiner* — Chi Tang P Cheng
(74) *Attorney, Agent, or Firm* — Holland & Hart LLP

(57) ABSTRACT

Methods, systems, and devices for wireless communication utilizing a data channel search space for initial data transmissions and retransmissions are described. In one aspect, a base station may configure a data channel search space and a plurality of monitoring occasions for a wireless device. The data channel search space may include a plurality of sets of decoding candidates on which the wireless device may receive data transmissions from the base station. At least one of a frequency location, a resource size, or a modulation and coding scheme can vary between different sets of decoding candidates. The wireless device performs blind decoding in its data channel search space to communicate with the base station.

31 Claims, 10 Drawing Sheets

RELIABLE LOW LATENCY WIRELESS COMMUNICATIONS

BACKGROUND

Technical Field

The technology described below relates generally to wireless communications and more specifically to reliable data retransmission in low latency conditions.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices also known as user equipment (UE).

Multiple access technologies have been adopted in various telecommunication standards to provide a common protocol that enables different wireless devices to communicate on a municipal, regional, national, and even global level. For example, a fifth generation (5G) wireless communications technology (which may be referred to as new radio (NR)) is being developed to expand and support diverse usage scenarios and applications with respect to current mobile network generations. Different aspects of 5G communications technology may include: enhanced mobile broadband addressing human-centric use cases for access to multimedia content, services and data; ultra-reliable-low latency communications (URLLC) with certain specifications for latency and reliability; and massive machine type communications, which can allow for a very large number of connected devices and transmission of a relatively low volume of non-delay-sensitive information. As the demand for such different types of service increases, however, further improvements in NR communications technology and beyond are needed.

BRIEF SUMMARY

The disclosed techniques relate to methods, systems, devices, and apparatuses that support low latency wireless communication. Generally, some described techniques provide for communication between a base station and a wireless device using a search space configured on data channel resources. According to the disclosed techniques, a base station may send initial data transmissions and successive retransmissions in a shared data channel thereby avoiding bottlenecks that can arise with grant-based communications which rely on control channel signaling. The innovative techniques can be implemented in a variety of settings. In one aspect, the wireless communications described herein may be used to convey small-size messages such those utilized by industrial internet of things (IIoT) and factory automation equipment. By limiting message sizes, in some aspects, the present techniques maintain comparable device complexity as needed for control channel-based communications.

As described herein, the present techniques can also implement adaptive retransmissions in which different resource sizes, frequency locations, and modulation and coding schemes are utilized for improved reliability in changing link conditions. For example, a wireless device may be configured to monitor a first set of decoding candidates in its physical downlink shared channel (PDSCH) search space in a monitoring occasion associated with initial transmissions. Other sets of decoding candidates may be configured in the PDSCH search space for use by the wireless device in the event that there is a decoding failure. The wireless device may, for example, monitor a second set of decoding candidates for all or a portion of the initial data transmission during a monitoring occasion associated with a first retransmission. The second set of decoding candidates may utilize different resource sizes, frequency locations, and/or modulation and coding than the first set of decoding candidates. Advantageously, initial transmissions and retransmission on the data channel does not involve control channel signaling and thus downlink control information is not needed to achieve link adaptation. Moreover, reliability of communication in the data channel search space does not depend upon a wireless device successfully receiving one-shot control channel signaling, but can instead leverage data channel-based error correction. These and additional aspects are described herein.

A method of wireless communication is described. The method may include receiving, by a wireless device, a physical downlink shared channel (PDSCH) from a base station. The method may include identifying, by the wireless device, a PDSCH search space and a plurality of monitoring occasions for use by the wireless device in receiving data transmissions from the base station. The PDSCH search space may include a plurality of sets of decoding candidates, and each set of decoding candidates may include a plurality of resource locations at which the wireless device may attempt to decode a data transmission from the base station. The method may include performing blind decoding on at least one set of decoding candidates in the PDSCH search space at least based on the plurality of monitoring occasions. The method may also include sending a communication to the base station based on a result of the blind decoding.

An apparatus for wireless communication is described. The apparatus may include means for receiving a physical downlink shared channel (PDSCH) from a base station. The apparatus may include means for identifying a PDSCH search space and a plurality of monitoring occasions for use by the apparatus in receiving data transmissions from the base station. The PDSCH search space may include a plurality of sets of decoding candidates, and each set of decoding candidates may include a plurality of resource locations at which the apparatus may attempt to decode a data transmission from the base station. The apparatus may include means for performing blind decoding on at least one set of decoding candidates in the PDSCH search space at least based on the plurality of monitoring occasions. The apparatus may also include means for sending a communication to the base station based on a result of the blind decoding.

Another apparatus for wireless communication is described. The apparatus may include a processor, memory coupled with the processor, and instructions stored in the memory. The instructions may be executable by the processor to cause the apparatus to receive a physical downlink shared channel (PDSCH) from a base station. The instructions may be executable by the processor to cause the apparatus to identify a PDSCH search space and a plurality of monitoring occasions for use by the apparatus in receiving data transmissions from the base station. The PDSCH search space may include a plurality of sets of decoding candidates and each set of decoding candidates may include a plurality of resource locations at which the apparatus may attempt to decode a data transmission from the base station. The instructions may also be executable by the processor to cause the apparatus to perform blind decoding on at least one set of decoding candidates in the PDSCH search space at least based on the plurality of monitoring occasions and to send a communication to the base station based on a result of the blind decoding.

A non-transitory computer readable medium is described. The non-transitory computer-readable medium may include instructions operable to cause a wireless device to receive a physical downlink shared channel (PDSCH) from a base station. The instructions may be further operable to cause the wireless device to identify a PDSCH search space and a plurality of monitoring occasions for use by the wireless device in receiving data transmissions from the base station. The PDSCH search space may include a plurality of sets of decoding candidates and each set of decoding candidates may include a plurality of resource locations at which the wireless device may attempt to decode a data transmission from the base station. The instructions may be operable to cause the wireless device to perform blind decoding on at least one set of decoding candidates in the PDSCH search space at least based on the plurality of monitoring occasions and to send a communication to the base station based on a result of the blind decoding.

In some examples of the method, apparatus, and non-transitory computer-readable medium described above, the wireless device may receive a PDSCH search space configuration from the base station via radio resource control (RRC) signaling. The configuration may indicate a frequency location, a resource size, a modulation and coding scheme (MCS), or any combination thereof, for each set of decoding candidates in the PDSCH search space. The configuration may be based on capabilities of the wireless device to support PDSCH search space operation. In some examples, the plurality of sets of decoding candidates of the PDSCH search space includes at least a first set of decoding candidates and a second set of decoding candidates. The frequency location, resource size, MCS, or any combination thereof, may differ between the first set of decoding candidates and the second set of decoding candidates. In some examples, the first set of decoding candidates is configured for use with a first retransmission of an initial data transmission from the base station and the second set of decoding candidates is configured for use with a second retransmission the initial data transmission. A larger resource size, a lower coding rate, or both, may be used with the second set of decoding candidates than with the first set of decoding candidates.

A method of wireless communication is described. The method may be performed by a base station and may include sending, to a wireless device, a configuration identifying a physical downlink shared channel (PDSCH) search space and a plurality of monitoring occasions. The PDSCH search space may include a plurality of sets of decoding candidates and each set of decoding candidates may include a plurality of resources available to the base station for sending data transmissions to the wireless device. The method may further include sending, by the base station, a data transmission in the PDSCH search space to coincide with a monitoring occasion in the plurality of monitoring occasions. The method may include receiving, from the wireless device, a communication indicating whether the data transmission was successfully received.

An apparatus for wireless communication is described. The apparatus may include means for sending, to a wireless device, a configuration identifying a physical downlink shared channel (PDSCH) search space and a plurality of monitoring occasions. The PDSCH search space may include a plurality of sets of decoding candidates and each set of decoding candidates may include a plurality of resources available for sending data transmissions to the wireless device. The apparatus may further include means for sending a data transmission in the PDSCH search space to coincide with a monitoring occasion in the plurality of monitoring occasions of the wireless device. The apparatus may include means for receiving, from the wireless device, a communication indicating whether the data transmission was successfully received.

Another apparatus wireless communication is described. The apparatus may include a processor, memory coupled with the processor, and instructions stored in the memory. The instructions may be executable by the processor to cause the apparatus to send, to a wireless device, a configuration identifying a physical downlink shared channel (PDSCH) search space and a plurality of monitoring. The PDSCH search space may include a plurality of sets of decoding candidates and each set of decoding candidates may include a plurality of resources available to the apparatus for sending data transmissions to the wireless device. The instructions may be executable by the processor to cause the apparatus to send a data transmission in the PDSCH search space to coincide with a monitoring occasion in the plurality of monitoring occasions. The instructions may be executable by the processor to cause the apparatus to receive a communication indicating whether the data transmission was successfully received by the wireless device.

A non-transitory computer readable medium is described. The non-transitory computer-readable medium may include instructions operable to cause a base station to send, to a wireless device, a configuration identifying a physical downlink shared channel (PDSCH) search space and a plurality of monitoring occasions for use by the wireless device in receiving data transmissions from the apparatus. The PDSCH search space may include a plurality of sets of decoding candidates and each set of decoding candidates may include a plurality of resources available for sending the data transmission to the wireless device. The instructions may be operable to cause the apparatus to send a data transmission in the PDSCH search space to coincide with a monitoring occasion of the wireless device. The instructions may be operable to cause the apparatus to receive a communication indicating whether the data transmission was successfully received by the wireless device.

In some examples of the method, apparatus, and non-transitory computer-readable medium described above, the PDSCH search space configuration may indicate a frequency location, a resource size, a modulation and coding scheme (MCS), or any combination thereof, for each set of decoding candidates in the PDSCH search space and the configuration may be sent via RRC signaling. The configuration may also be based on capabilities of the wireless device to support PDSCH search space operation. In some examples, the plurality of sets of decoding candidates configured for the wireless device includes at least a first set of decoding candidates and a second set of decoding candidates. The frequency location, resource size, MCS, or any combination thereof, may differ between the first set of decoding candidates and the second set of decoding candidates. In some examples, the first set of decoding candidates is configured for use with a first retransmission of an initial data transmission from the base station and the second set of decoding candidates is configured for use with a second retransmission the initial data transmission. A larger resource size, a lower coding rate, or both, may be used with the second set of decoding candidates than with the first set of decoding candidates.

DETAILED DESCRIPTION

Figure 1:
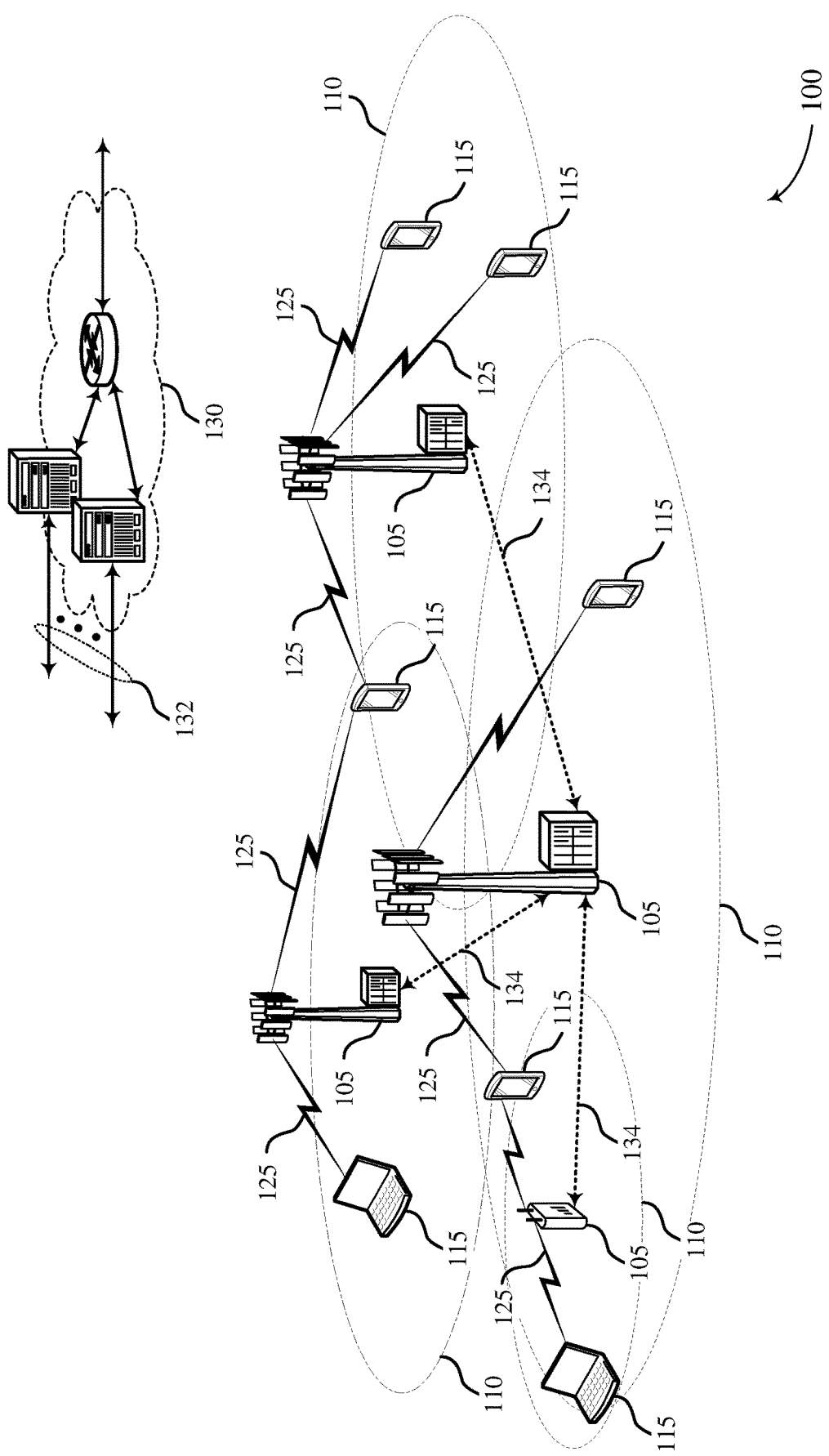
FIG. 1 shows an example of a system for wireless communication in accordance with aspects of the present disclosure.

Advanced wireless communication systems such as New Radio (NR) from the $3^{rd}$ Generation Partnership Project (3GPP) will introduce new service types, including a new service type for ultra-reliable, low latency (URLLC) communications. Latency and reliability targets associated with the URLLC service are expected to be aggressive, possibly requiring block error rates (BLER) on the order of $10^{-6}$ within a latency budget of 500 us. Conventional grant-based operation relying upon control channel communications may not be adequate to support these more rigorous targets as the reliability of PDCCH, and the one-shot nature of control channel communication, may become reliability bottlenecks.

Additionally, HARQ operation for new service types should be both adaptive to link conditions and able to fully exploit soft combining so as to leverage information from multiple retransmissions. With conventional techniques for adaptive HARQ, a new resource grant may be provided on the control channel for each retransmission to specify which resources are being allocated for the retransmission. However, with this grant-based approach, each control channel message is effectively a single-shot transmission which may be missed or which otherwise may fail to decode at the user equipment. Such a control channel-centric approach also may not benefit from soft combining as is applicable to data channel transmissions. It may, therefore, be difficult to achieve heightened reliability targets through a series of control-based retransmissions. Another conventional HARQ technique involves using the same resources for retransmission as were allocated in the initial grant. Such a non-adaptive, synchronous HARQ may be used for uplink retransmission in LTE systems, for example. This approach also suffers from deficiencies. In particular, because it utilizes the same time-frequency resources, it cannot adapt to changing link conditions and the block error rate achievable through such retransmissions may not meet service requirements within hard latency bounds.

Techniques described in the present disclosure may avoid these problems and may offer better performance than conventional approaches, particularly for high-reliability, low-latency service types. In the examples described herein, initial transmissions may be performed using data channel resources in a data channel search space configured in a slot or subframe. The data channel search space is also referred herein as a "PDSCH search space" without loss of generality. When retransmission is needed, the retransmitted data may be sent on a different set of decoding candidates in the PDSCH search space than were used for the initial transmission. A wireless device may monitor its data channel search space for retransmissions in accordance with its configuration. Data channel-based retransmissions can be adaptive in the sense that the time-frequency resources utilized can vary according to link conditions through different resource allocations within the data channel search space. This may help a wireless communication system to achieve reliability targets within given latency bounds. Additionally, initial transmissions and retransmissions using the data channel-based search space are "control free" in the sense that control channel signaling is not utilized (e.g., resource grants on the control channel are avoided). The wireless device performs blind decoding of data channel resources in its PDSCH search space to detect initial and retransmissions of data. In this way, the benefits of soft combining are realized for the data channel-based retransmission and reliability is potentially improved in comparison with a series of one-shot control channel messages. Also, as described herein, decoding complexity of the control-free design can be managed by associating different retransmissions with different parts of the PDSCH search space so that wireless devices can limit their monitoring accordingly. Different sets of decoding candidates in the PDSCH and monitoring occasions that restrict search space monitoring can be configured by the base station or otherwise made known to the UE (e.g., provisioned in the device, conveyed by system information messages, etc.). Finally, since blind decoding on the control channel is not required, monitoring the PDSCH search may not impose a significant additional burden on the wireless device.

Aspects of the disclosure are initially described in the context of a wireless communications system and relate to data channel search space operation for initial data transmissions and retransmissions. Aspects of the disclosure are further illustrated by and described with reference to apparatus diagrams, system diagrams, and flowcharts that relate to the foregoing. While aspects and embodiments are described in this application using various illustrations and examples, those skilled in the art will understand that additional implementations and use cases may come about in many different arrangements and scenarios. The innovations described herein may be implemented across different platforms, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, filters, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example of a system 100 in accordance with various aspects of the present disclosure. System 100 includes base stations 105, UEs 115, and a core network 130. In some examples, system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. As described herein, a base station 105 may include or may be referred to as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may include one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of a corresponding geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. System 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, the cells may support different service and/or device types (e.g., machine-type communication (MTC), narrowband Internet-of-Things (NB-IoT), enhanced mobile broadband (eMBB), ultra-reliable low-latency (URLLC) communications, and others). In some cases, the term "cell" may refer to a portion of a geographic coverage area 110 (e.g., a sector) over which the logical entity operates.

UEs 115 may be dispersed throughout system 100, and each UE 115 may be stationary or mobile. A UE 115 may also be referred to as a wireless device, a mobile device, a mobile station, a remote device, a handheld device, or a subscriber device, or some other suitable terminology, where the "device" may also be referred to as a unit, a station, a terminal, or a client. A UE 115 may also be a electronic device such as a cellular phone, a personal digital assistant (PDA), a tablet computer, a laptop computer, a medical device, industrial equipment, a sensor, an entertainment device, and/or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and system 100 may be configured to provide ultra-reliable communications for these functions.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to a network operator's IP services. Operator IP services may include access to the Internet, Intranet(s), an IP Multimedia Subsystem (IMS), or a Packet-Switched (PS) Streaming Service.

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

Base station 105 may transmit a control channel, such as a physical downlink control channel (PDCCH), in order to convey a downlink control information (DCI) message including control information to UE 115. The DCI message can be UE-specific (dedicated) or cell-specific (common) and placed in different dedicated and common search spaces within the PDCCH. A single PDCCH may carry DCI messages associated with multiple UEs 115. A particular UE 115 may, therefore, need to recognize the DCI messages that are intended for it. To that end, a UE 115 may be assigned one or more UE-specific search spaces in the control channel, and may also utilize common search spaces allocated to the UE 115 as well as other UEs 115 in the system 100. The UE 115 may attempt to decode the DCI by performing a process known as blind decoding, during which multiple decode attempts are carried out in the search spaces until the DCI message is detected.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

As disclosed herein, UEs 115 and base stations 105 may also support control-free operation using a data channel-based search space. A base station may configure a UE 115 with a PDSCH search space. The PDSCH search space may encompass a set of data channel resources and may be separate and distinct from PDCCH-based search spaces which convey DCI messages. Whereas PDCCH-based search spaces may include different types of control information and may provide resource grants for a variety of different services, a data channel (or PDSCH)-based search space may be used directly for initial and HARQ retransmissions of data by a base station 105 to one or more of UEs 115. The base station 105 may separately configure a PDSCH search space for each UE 115. The configuration may be specific to a given service type (such as URLLC). Multiple PDSCH search spaces may be configured for a UE 115 in support of different services. Alternatively, the base station 105 may configure a UE 115 with one PDSCH search space for multiple service types. Data channel search space configurations may be semi-persistent and may apply as long as the association between a UE 115 and the base station 105 is established.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers. A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

System 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable. Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
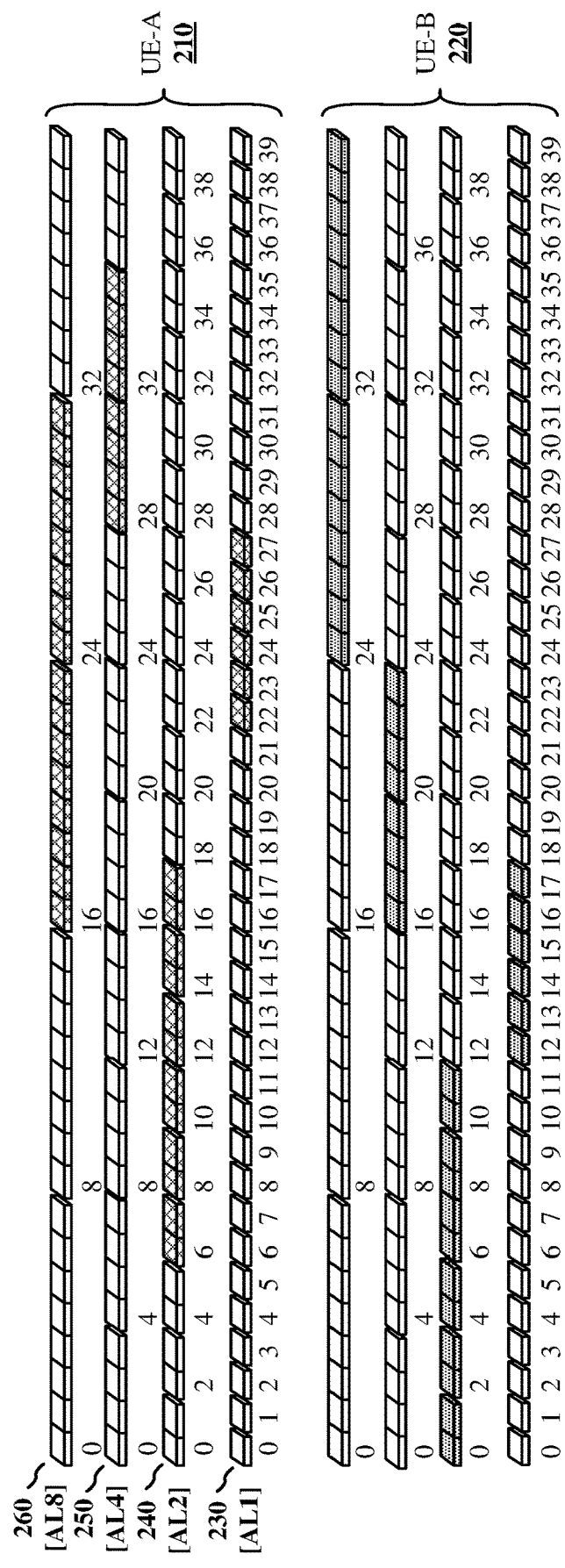
FIG. 2 shows an exemplary data channel search space in accordance with aspects of the present disclosure.

FIG. 2 illustrates an exemplary search region 200 that supports control-free initial transmissions and adaptive HARQ retransmission in accordance with various aspects of the present disclosure. In this example, search region 200 is located in a physical downlink shared channel (PDSCH) and comprises a plurality of sets of decoding candidates configured for use by different UEs (UE-A, UE-B). As shown, search region 200 spans from PRB0 to PRB39 in the PDSCH and each decoding candidate may include an integer number of PRBs or other time-frequency resources. Each UE 115 (UE-A, UE-B) may be configured to monitor sets of decoding candidates in its corresponding PDSCH search space 210, 220 for initial data transmissions and HARQ-based retransmissions.

Data channel (PDSCH) search spaces 210, 220 may be allocated respective user equipment devices 115 (UE-A, UE-B) within search region 200. Resources within the PDSCH search spaces 210, 220 may include data channel elements such as physical resource blocks (PRBs) or other time-frequency units over which transmissions to a wireless device (e.g., a corresponding UE) may be sent. A UE 115 served by a base station 105 may also monitor a distinct control channel search space in the PDCCH. However, the PDSCH search spaces 210, 220 comprise data channel resources and do not utilize grant-based control channel signaling. In some aspects, the PDSCH search spaces 210, 220 may be used to send small messages of up to approximately 40 bytes of data such as in an industrial IoT or factory automation context. The PDSCH search spaces 210, 220 may or may not include a common PDSCH search space for broadcast downlink traffic.

Each PDSCH search space 210, 220 may comprise a plurality of sets of decoding candidates that are configured for a respective UE. Across different UEs, search spaces may (partially) overlap (e.g., may share some PRBs or other time-frequency units). A base station 105 may inform a UE 115 of an arrangement of its decoding candidates (e.g., which PRBs or other elements correspond to which decoding candidates), select a set of one or more elements corresponding to one or more of the decoding candidates to use for a data channel-based transmission or retransmission, and send data to the UE 115 using the selected data channel elements. A UE 115 may identify its PDSCH search space and perform blind decoding on one or more sets of decoding candidates. In some aspects, the one or more sets of decoding candidates on which the UE attempts decoding correspond to particular monitoring occasions such as monitoring occasions associated with an initial data transmissions from a base station, monitoring occasions associated with a first retransmissions from the base station, monitoring occasions associated with a second retransmissions from the base station, etc. The association of monitoring occasions with initial transmissions or successive retransmissions may form part of the PDSCH search space configuration.

The decoding candidate structure shown in FIG. 2 may group PRBs or other time-frequency units within a PDSCH search space 210, 220 into particular sets of decoding candidates or aggregation levels (ALs). Different aggregation levels may represent different choices of modulation scheme and coding rate. For example, a high AL may correspond to low coding rate (e.g., rate 1/4 as opposed to rate 1/2) and modulation scheme (QPSK as opposed to QAM16). For UE-A, four sets of decoding candidates 230, 240, 250, 260 are shown comprising PDSCH search space 210. The sets of decoding candidates 230, 240, 250, 260 may have different resource sizes (e.g., different numbers of constituent elements), different frequency locations, and different modulation and coding. In the present example, for PDSCH search space 210, the first set of decoding candidates 230 corresponds to aggregation level AL1 and defines a single-PRB resource size, the second set of decoding candidates 240 corresponds to aggregation level AL2 and defines a two-PRB resource size, the third set of decoding candidates 250 corresponds to aggregation level AL4 and defines a four-PRB resource size, and the fourth set of decoding candidates 260 corresponds to aggregation level AL8 and defines an eight-PRB resource size. Specific decoding candidates (resource locations) for monitoring by UE-A in its different sets of decoding candidates 230, 240, 250, 260 are shown with a cross-hatch pattern. For example, UE-A may monitor PRBs 22, 23, 24, 25, 26, 27 with a single-PRB resource size in its first set of decoding candidates 230, PRBs (6, 7), (8, 9), (10, 11), (12, 13), (14, 15), and (16, 17) with a two-PRB resource size in its second set of decoding candidates 240, PRBs (28, 29, 30, 31) and (32, 33, 34, 35) with a four-PRB resource size in its third set of decoding candidates 250, and PRBs (16, 17, . . . , 23) and (24, 25, . . . , 31) with an eight-PRB resource size in its fourth set of decoding candidates 260. PDSCH search space 220 may define different sets of decoding candidates and different monitoring occasions for use by UE-B. It will be recognized that different resource sizes and more or fewer sets of decoding candidates are specifically contemplated within the scope of the present disclosure.

Each set of decoding candidates 230, 240, 250, 260 of PDSCH search space 210 for UE-A may be associated with a specific transmission or retransmission in a particular monitoring occasion. As one example, initial data transmissions for UE-A may be associated with the first set of decoding candidates 230, the second set of decoding candidates 240, and the third set of decoding candidates 250. In that case, UE-A would monitor three sets of decoding candidates in connection with initial data transmissions from its serving base station in a first monitoring occasion. UE-A may also be configured to monitor different sets of decoding candidates in PDSCH search space 210 in connection with a first retransmission of the initial data transmission. For example, UE-A may be configured to monitor the second set of decoding candidates 240 and the third set of decoding candidates 250 in a monitoring occasion associated with first retransmissions, etc. The PDSCH search space configuration may be implicitly or explicitly signaled to UEs 115. In one aspect, a base station 105 may provide an RRC configuration for each UE 115 identifying its PDSCH search space as well as a frequency location, a resource size, a modulation and coding scheme (MCS), or any combination thereof, for each set of decoding candidates. In one aspect, part or all of this information may be signaled in system information and UEs 115 may identify a specific PDSCH search space configuration based on a UE-specific identifier or other configured value.

While the example of FIG. 2 has been used for purposes of illustration, any association between a set of decoding candidates and an initial or retransmission of data can be used. Also, different sets of decoding candidates with a same resource size may be used for different transmission. For example, UE-A may be configured with different sets of decoding candidates having the same resource size but occupying different frequency locations/PRBs of search range 200 in order to achieve frequency diversity across successive transmissions. Likewise, the modulation and coding scheme used may be such that different sets of decoding candidates are adapted to different channel conditions. For instance, in good channel conditions, UE-A may be able to receive a 40-byte message on only 2 PRBs, while it may need 4 PRBs to receive the same 40 byte message in poor channel conditions. Generally speaking, larger resource sizes (higher aggregation levels) may be used/monitored as the number of retransmissions increases. While four sets of decoding candidates 230, 240, 250, 260 are used to illustrate PDSCH search space 210 for UE-A, more or fewer sets of decoding candidates with different combinations for resource size, modulation and coding, and frequency location may be configured for each UE served by a particular base station. As discussed further herein, a PDSCH search space configuration may also be based on UE capabilities.

The examples described herein provide a number of benefits. Use of the PDSCH search space avoids the need for a base station 105 to send control channel messages to schedule each data transmission. Also, the base station 105 can freely adapt resources allocated for a retransmission in accordance with link conditions. By utilizing the data channel, a UE can perform soft combining across transmissions to improve its chances of successful decoding within prescribed latency bounds. Reliability can also be enhanced by associating larger resource sizes (higher aggregation levels) with successive retransmissions to facilitate achieving a reliability target within a hard latency bound. Such an association can be based on latency considerations (e.g., how many HARQ retransmissions are possible within a hard latency bound) and/or a target reliability (e.g., which chunks of the data should be retransmitted to ensure the likelihood of successful decoding at a given block error rate). The frequency location of decoding candidate sets in the PDSCH search space, the resource size of decoding candidates, the MCS used, and the association of decoding candidates with particular monitoring occasions can be signaled from the base station 105 to the UE 115 in any available manner, including via one or more RRC configuration messages.

Figure 3:
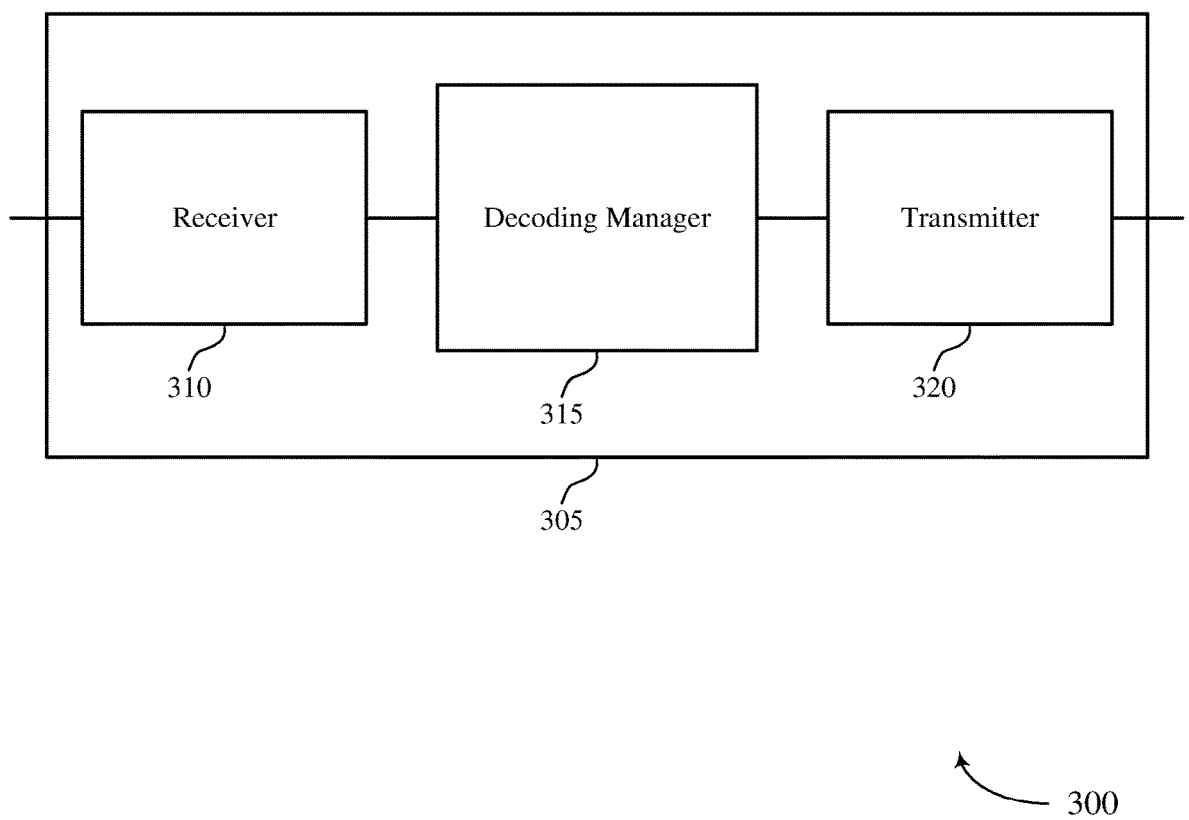
FIGS. 3-5 show block diagrams of a wireless device that supports data channel search space operation for initial data transmissions and retransmissions in accordance with aspects of the present disclosure.

FIG. 3 shows a block diagram 300 of a wireless device 305 that supports a data channel search space for initial data transmissions and retransmissions in accordance with aspects of the present disclosure. Wireless device 305 may be an example of aspects of the user equipment 115 described with reference to FIG. 1. Wireless device 305 may include a receiver 310, a decoding manager 315, and a transmitter 320. Wireless device 305 may also include a processor. Each of these components may be in communication with one another (e.g., via one or more buses).

Receiver 310 may be configured to receive information such as packets, user data, or control information associated with various information channels (e.g., control channels, data channels, system information, configuration messages, etc.). For example, under the control of decoding manager 315, receiver 310 may receive slots or subframes having a data channel that, in turn, includes initial data transmissions or retransmissions in a PDSCH search space for wireless device 305 as described herein. Receiver 310 may passed such information on to other components of wireless device 305. For example, receiver 310 may pass information to decoding manager 315.

Receiver 310 may be an example of aspects of the transceiver 535 described with reference to FIG. 5. Decoding manager 315 may be an example of aspects of the decoding manager 415 described with reference to FIG. 4, or decoding manager 515 described with reference to FIG. 5.

Decoding manager 315 and/or at least some of its various sub-components may be implemented in hardware, software executed by a processor, firmware, or any combination thereof. If implemented in software executed by a processor, the functions of the decoding manager 315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some examples, decoding manager 315 and/or at least some of its sub-components may be configured as a separate and distinct element in accordance with various aspects of the present disclosure. In other examples, decoding manager 315 and/or at least some of its various sub-components may be combined with one or more other hardware components, including but not limited to an I/O component, a transceiver, one or more other components described in the present disclosure, or a combination thereof in accordance with various aspects of the present disclosure.

Decoding manager 315 may be configured to perform blind decoding on one or more sets of decoding candidates in a PDSCH search space of wireless device 305. Each set of decoding candidates may comprise a plurality of resources on which decoding manager 315 attempts to decode a data transmission from a base station. Decoding manager 315 may perform blind decoding on subframes or slots received via receiver 310 in predetermined monitoring occasions. For example, wireless device 305 may be configured with a PDSCH search space as described in connection with FIG. 2 and a plurality of monitoring occasions. Wireless device 305 may receive a slot or subframe via receiver 310 in a monitoring occasion associated with initial data transmissions. Decoding manager 315 may identify one or more sets of decoding candidates within its PDSCH search space on which to attempt blind decoding. A configuration of wireless device 305 may indicate a frequency location, resource size, and MCS for each set of decoding candidates to be tested during the initial data transmission monitoring occasion.

When decoding the initial data transmission does not succeed, decoding manager 315 can monitor one or more sets of decoding candidates in the PDSCH channel search space for a first retransmission during an associated monitoring occasion. The first retransmission may comprise some or all of the initial data transmission. Decoding manager 315 can perform blind decoding on a candidates obtained from receiver 310. For example, decoding manager 315 can perform blind decoding on identified sets of decoding candidates and, when a retransmission is detected, it can be decoded with the aid of soft combining, etc. Additional control signaling for the retransmission of the data is not utilized and, as discussed in connection with link adaptation, the data channel resources in the PDSCH search space associated with the retransmission can be different than the data channel resources associated with the initial data transmission which failed to decode.

Transmitter 320 may be configured to transmit signals generated by other components of wireless device 305. For example, transmitter 320 may send acknowledgement (ACK)/negative acknowledgement (NACK) signals based on whether data transmissions are successfully received and decoded. In some examples, the transmitter 320 may be collocated with a receiver 310 in a transceiver module. For example, the transmitter 320 may be an example of aspects of the transceiver 535 described with reference to FIG. 5. The transmitter 320 may include a single antenna, or it may include a set of antennas.

Figure 4:
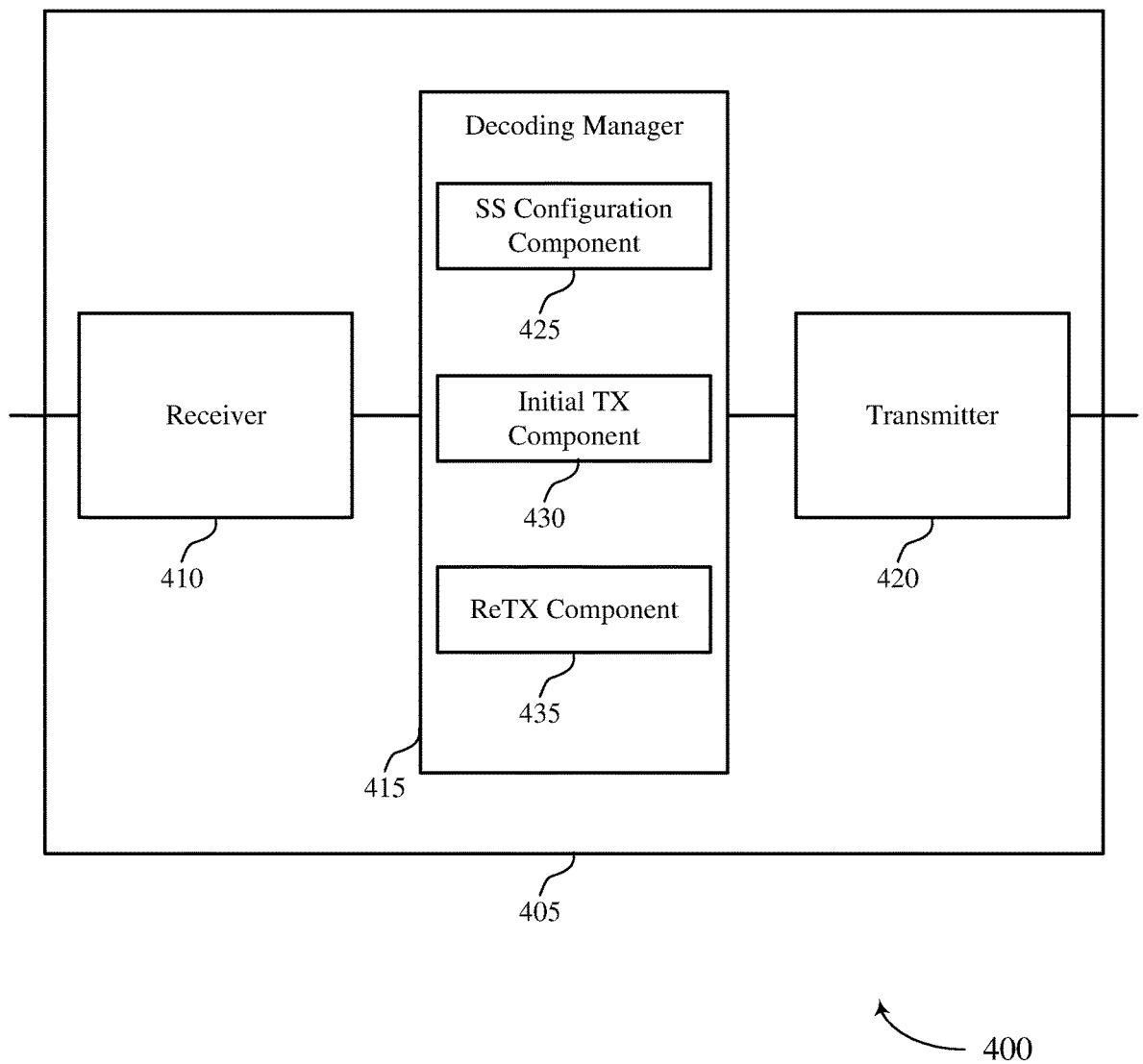

FIG. 4 shows a block diagram 400 of a wireless device 405 that supports data channel search space operation in accordance with various aspects of the present disclosure. Wireless device 405 may be an example of aspects of a wireless device 305 or a user equipment 115 as described with reference to FIGS. 1 and 3. Wireless device 405 may include a receiver 410, a decoding manager 415, and a transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, etc.). In one aspect, receiver 410 is configured to receive a device configuration via RRC configuration, system information block messages, and other signaling from a base station and to pass such information on to other components of wireless device 405. Receiver 410 may be an example of aspects of the transceiver 535 described with reference to FIG. 5.

Decoding manager 415 may be an example of aspects of the decoding manager 315 or decoding manager 515 described with reference to FIGS. 3 and 5. As shown, decoding manager 415 may include a search space (SS) configuration component 425, an initial transmission (TX) component 430, and a retransmission (ReTX) component 435.

SS configuration component 425 may be configured to identify a data channel (PDSCH) search space and a plurality of monitoring occasions for use by wireless device 405 in communicating with a base station. The PDSCH search space configuration may identify a location in the data channel that is to be monitored for control-free data transmissions and retransmissions. The location may comprise a frequency range, a collection of data channel resources, or some other set of time-frequency units to be monitored in the data channel. The PDSCH search space configuration may be signaled to wireless device 405 by a serving base station when it attaches to a network and may be semi-persistent, lasting as long as the association is maintained.

In some aspects, SS configuration component 425 determines the data channel search space configuration based on one or more RRC configuration messages. RRC messages may identify a PDSCH search region and/or UE-specific offsets for monitoring. For instance, a base station 105 may send one or more RRC messages in which a frequency range of the PDSCH search space and a plurality of monitoring occasion are identified for wireless device 405. The configuration may identify a plurality of sets of decoding candidates and may indicate, for each set of decoding candidates, a frequency location within the PDSCH search space, a resource size, a modulation and coding scheme (MCS), or any combination thereof. Each set of decoding candidates may be associated with one or more of the monitoring occasions and each monitoring occasion may be associated with a particular data transmission from the serving base station (e.g., an initial data transmission, a first retransmission, a second retransmission, etc.). In another aspect, at least part of the PDSCH search space configuration may be based upon system information or other broadcast information. For example, SS configuration component 425 may be configured to determine parts of the PDSCH search space configuration based on an identifier associated with wireless device 405. The RRC configuration messages, system information, or broadcast signaling may be obtained from receiver 410.

Initial TX component 430 may be configured to monitor for initial data transmissions in the PDSCH search space. In some aspects, data channel resources for initial transmissions may be preconfigured for wireless device 405 as part of the configuration that is identified by SS configuration component 425. In that case, initial TX component 430 may be operative to monitor for new data on the preconfigured resources during a monitoring occasion associated with initial data transmissions. Initial TX component 430 may attempt decoding of the preconfigured resources and may generate HARQ feedback based on a result of the attempted decoding. Initial TX component 430 may store information to facilitate error correction by HARQ operation in one or more successive retransmissions. In other aspects, wireless device 405 may be configured to perform blind decoding for both initial data transmissions and retransmissions. For example, initial TX component 430 may be configured to perform blind decoding on one more sets of decoding candidates defined within the PDSCH search space. This may include searching a plurality of sets of decoding candidates and, in each set of decoding candidates, attempting to decode a data transmission from a base station at a plurality of resource locations during a monitoring occasion associated with initial data transmissions. Resource sizes, modulation and coding schemes, and frequency/PRB locations can vary for each set of decoding candidates.

Retransmission (ReTX) component 435 may be configured to manage the retransmission of initial data transmissions and may facilitate error correction through HARQ operation with link adaptation. In some aspects, ReTX component 435 is configured to monitor one or more different sets of decoding candidates in the PDSCH search space than initial TX component 430. For example, SS configuration component 425 may identify a PDSCH search space configuration for wireless device 405 in which initial TX component 430 is configured to monitor predetermined resources or a first set of decoding candidates for initial data transmissions from a base station. The PDSCH search space configuration may identify a second set of decoding candidates for use with one or more retransmissions of the initial data transmission which are monitored by ReTX component 435 during corresponding monitoring occasions. At least one of the frequency location, the resource size, or the MCS may differ between the first set of decoding candidates and the second set of decoding candidates such that link adaptation can occur between the initial data transmission and successive retransmissions. Reliability may be improved by varying the coding rate and resource size across retransmissions using the plurality of sets of decoding candidates. In one aspect, a larger resource size, a lower coding rate, or both, is used with the second set of decoding candidates than with the first set of decoding candidates to send a given amount of data as the number of retransmissions increases.

Transmitter 420 may be configured to transmit signals generated by other components of wireless device 405. In one aspect, transmitter 420 may be configured to communicate with a base station based on a result of the decoding by initial TX component 430 and/or ReTX component 435. For instance, transmitter 420 may be configured to send ACK/NACK feedback to the base station in connection with initial data transmissions and/or to facilitate HARQ operation in the PDSCH search space. In some examples, the transmitter 420 may also be configured to send information about a capability of wireless device 405 to support PDSCH search space operation. In one aspect, transmitter 420 may send such information as part of an initial capabilities exchange. In other aspects, support for PDSCH search space operation may be signaled to the base station after a connection has been established or when requested by the base station.

Transmitter 420 may be collocated with receiver 410 in a transceiver module. In some aspects, transmitter 420 may form part of transceiver 535 as described with reference to FIG. 5. Transmitter 420 may include a single antenna, or it may include a set of antennas.

Figure 5:
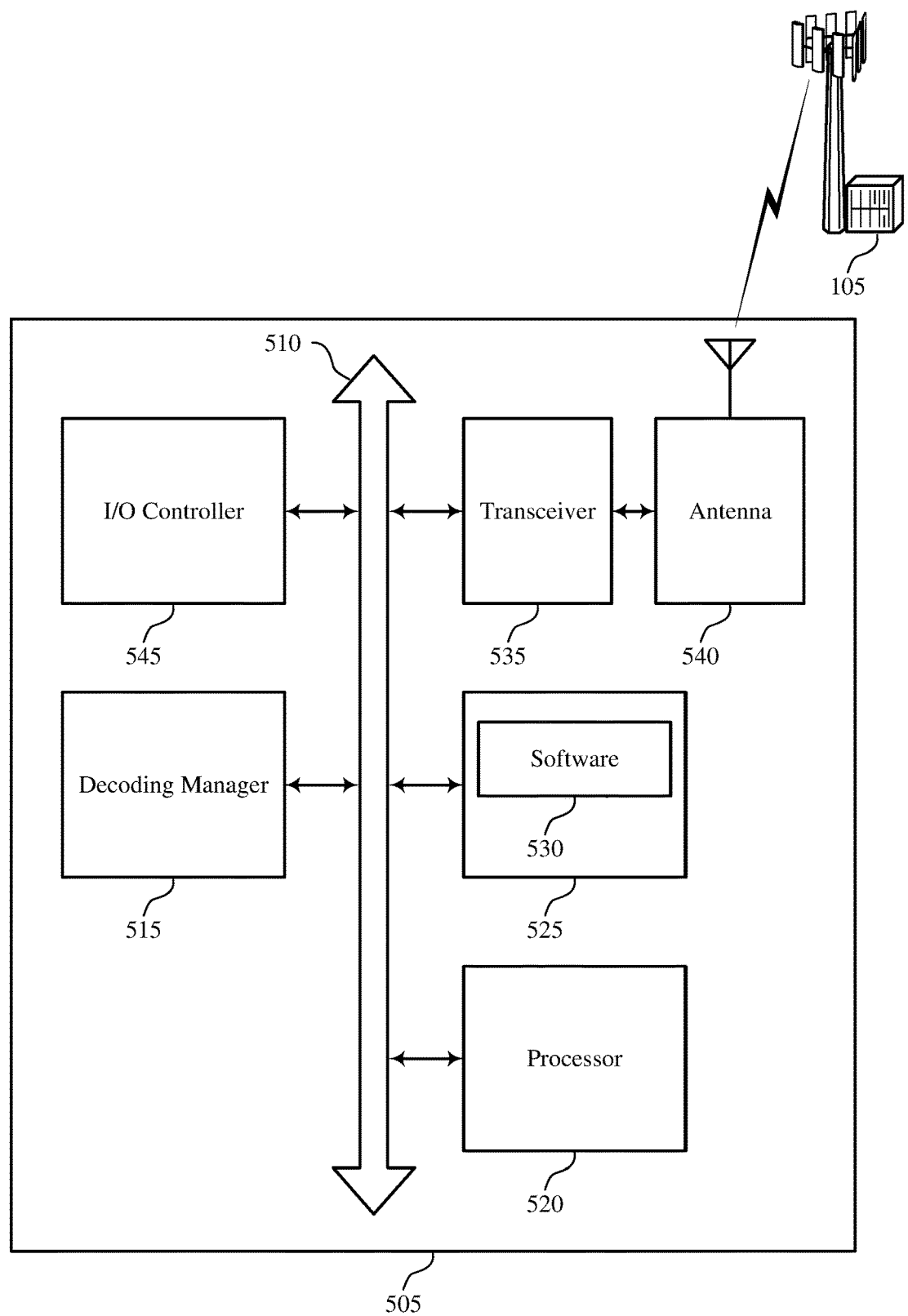

FIG. 5 shows a system 500 including a wireless device 505 that supports data channel search space operation in accordance with various aspects of the present disclosure. Wireless device 505 may be an example of, or include the components of, a UE or wireless device as described above, e.g., with reference to FIGS. 1, 3, and 4. Wireless device 505 may include components for bi-directional voice and data communications including components for transmitting and receiving communications, including decoding manager 515, processor 520, memory 525, software 530, transceiver 535, antenna 540, and I/O controller 545. These components may be coupled via one or more busses (e.g., bus 510). Device 505 may communicate wirelessly with one or more base stations 105.

Processor 520 may include an intelligent hardware device, (e.g., a general-purpose processor, an application processor, a SNAPDRAGON®, a DSP, a CPU, a microcontroller, an ASIC, an FPGA, a programmable logic device, a discrete gate or transistor logic component, a discrete hardware component, or any combination thereof). In some cases, processor 520 may be configured to operate a memory array using a memory controller. In other cases, a memory controller may be integrated into processor 520. Processor 520 may be configured to execute computer-readable instructions stored in a memory to perform various functions (e.g., functions or tasks supporting control-free adaptive HARQ operation).

Memory 525 may include RAM and ROM. The memory 525 may store computer-readable, computer-executable software 530 including instructions that, when executed, cause the processor to perform various functions described herein. In some cases, the memory 525 may contain, among other things, a BIOS which may control basic hardware and/or software operation such as the interaction with peripheral components or devices.

Software 530 may include code to implement aspects of the present disclosure, including code to support data channel search space operation. Software 530 may be stored in a non-transitory computer-readable medium such as system memory or other memory. In some cases, the software 530 may not be directly executable by the processor but may cause a computer (e.g., when compiled and executed) to perform functions described herein.

Transceiver 535 may form a communications interface of wireless device 505 and may be operative for bi-directional communication, via one or more antennas, wired, or wireless links as described above. For example, the transceiver 535 may represent a wireless transceiver and may communicate bi-directionally with another wireless transceiver. The transceiver 535 may also include an RF front end to process a baseband signal and provide its output to the antennas 540 for transmission, and to similarly process packets received from the antennas.

In some cases, the wireless device 505 may include a single antenna 540. However, in some cases the wireless device 505 may have more than one antenna 540, which may be capable of concurrently transmitting or receiving multiple wireless transmissions.

I/O controller 545 may manage input and output signals for device 505. I/O controller 545 may also manage peripherals not integrated into wireless device 505. In some cases, I/O controller 545 may represent a physical connection or port to an external peripheral. In some cases, I/O controller 545 may utilize an operating system such as iOS®, ANDROID®, MS-DOS®, MS-WINDOWS®, OS/2®, UNIX®, LINUX®, or another known operating system. In other cases, I/O controller 545 may represent or interact with a modem, a keyboard, a mouse, a touchscreen, or a similar device. In some cases, I/O controller 545 may be implemented as part of a processor. In some cases, a user may interact with wireless device 505 via I/O controller 545 or via other hardware components controlled by I/O controller 545.

Figure 6:
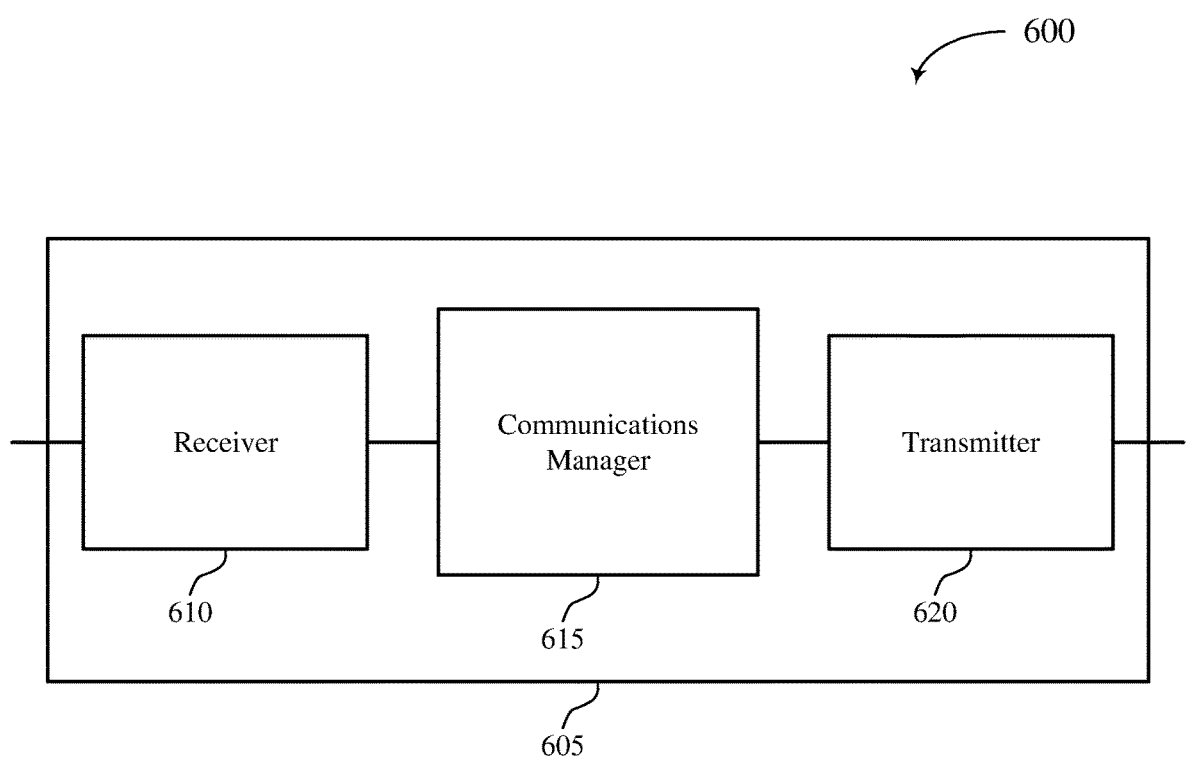
FIGS. 6-8 show block diagrams of a base station that supports data channel search space operation for initial data transmissions and retransmissions in accordance with aspects of the present disclosure.

FIG. 6 shows a block diagram 600 of a wireless device 605 that supports data channel search space operation in accordance with various aspects of the present disclosure. Wireless device 605 may be an example of aspects of a base station 105 as described with reference to FIG. 1. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, HARQ feedback, etc.). For example, receiver 610 may detect acknowledgement or negative acknowledgment signals from user equipment devices responsive to the downlink transmissions of wireless device 605. Such information may be passed on to other components. Receiver 610 may be an example of aspects of transceiver 835 as described with reference to FIG. 8.

Transmitter 620 may transmit signals generated by other components of wireless device 605. For example, under the control of communications manager 615, transmitter 620 may transmit slots or subframes having a data channel search space in which data transmissions and retransmissions of data to a user equipment occur without control channel signaling and which can support adaptive HARQ operation as described herein. In some examples, the transmitter 620 may be collocated with a receiver 610 in a transceiver module. For example, the transmitter 620 may be an example of aspects of the transceiver 835 described with reference to FIG. 8. The transmitter 820 may include a single antenna, or it may include a set of antennas.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. Communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Communications manager 615 may be an example of aspects of the communications manager 715 described with reference to FIG. 7, or base station communications manager 815 described with reference to FIG. 8.

In one aspect, communications manager 615 may be configured to control operation of wireless device 605 to send a configuration identifying a data channel search space and a plurality of monitoring occasions for use by a user equipment in receiving data transmissions from wireless device 605. The configuration may identify a plurality of sets of decoding candidates in the data channel search space to be monitored by the user equipment or wireless device to which the configuration applies. Each set of decoding candidates may include a plurality of resources available for sending an initial data transmission or retransmission. In one aspect, the data channel search space configuration indicates a frequency location, a resource size, a modulation and coding scheme (MCS), or any combination thereof, for each set of decoding candidates in the plurality of sets of decoding candidates. The frequency location, resource size, MCS, or any combination thereof, may be different for different sets of decoding candidates in a same PDSCH search space configuration.

Communications manager 615 may be configured to determine resource locations within a set of decoding candidates of the data channel search space for a transmission to the user equipment. For example, communications manager 615 may select resources in a first set of decoding candidates for an initial transmission and resources in a second set of decoding candidates for a retransmission in accordance with the data channel search space configuration of the user equipment. The initial data transmission and any associated retransmissions may occur during corresponding monitoring occasions configured for the user equipment so that they can be located by the user equipment through blind decoding. This can provide increased scheduling flexibility for wireless device 605 as well as enabling link adaptation between successive transmissions without the need for control signaling. After the data transmission has been sent, wireless device 605 may receive a communication from the user equipment (via receiver 610) indicating whether the data transmission was successfully received.

Figure 7:
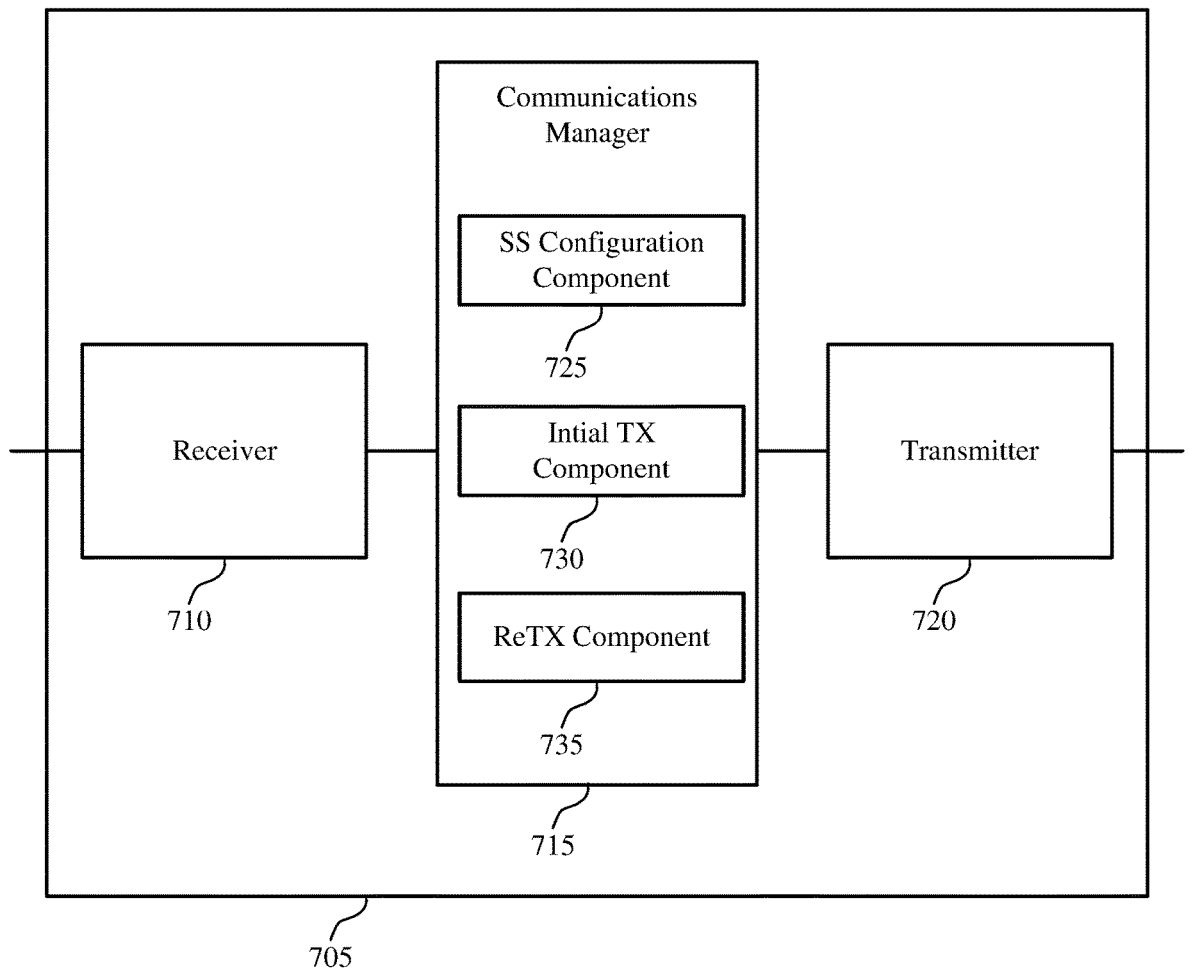

FIG. 7 shows a block diagram 700 of a base station 705 that supports data channel search space operation for initial data transmissions and retransmissions in accordance with various aspects of the present disclosure. Base station 705 may be an example of aspects of a wireless device 605, or a base station 105, as described with reference to FIGS. 1 and 6. Base station 705 may include a receiver 710, a communications manager 715, and a transmitter 720. Base station 705 may also include a processor. Each of these components may be in communication with one another (e.g., via one or more buses).

Receiver 710 may be configured to receive information such as packets, user data, or control information. This information may include acknowledgement/negative acknowledgment (ACK/NACK) feedback from user equipment devices indicating whether such devices successfully received downlink transmissions from base station 705. Receiver 710 may also receive capabilities signaling relating to support of data channel search space operation from one or more wireless devices. Such information may be passed on to other components of the device. The receiver 710 may be an example of aspects of the transceiver 835 described with reference to FIG. 8.

Communications manager 715 may be an example of aspects of the communications manager 615 described with reference to FIG. 6. As shown, in this example, communications manager 715 includes a search space (SS) configuration component 725, an initial transmission (TX) component 730, and a retransmission (ReTX) component 735.

SS configuration component 725 may be configured to determine a data channel (PDSCH) search space and a plurality of monitoring occasions for use by a wireless device in receiving data transmissions from base station 705. In some aspects, the data channel search space configuration may be based on capabilities of the wireless device under configuration. Some devices served by base station 705 may not support data channel search space operation, or may support data channel search space operation only with certain limitations. For instance, a wireless device may report that it supports data channel search operation, but with limits on the total number of decoding candidates, a maximum resource size, a certain MCS, a size of data packets, or any combination thereof. In that case, the data channel search space configuration provided by SS configuration component 725 may reflect those limits and ensure that the data channel search space configuration is appropriate for device capabilities. Other devices, however, may report a capability to support full use of the data channel search space with no limits on decoding candidate, resource size, MCS, payload, etc. In either case, base station 705 may first determine a capability of the wireless device to support data channel search space operation and then determine a suitable data channel search space configuration based on device capabilities.

As an illustration of a configuration based on device capabilities, consider a first wireless device that reports a limited capability to support data channel search space operation. SS configuration manager 725 may provide the first wireless device with a PDSCH search space consisting of two sets of decoding candidates. Candidate set 1 may have a resource size of 2 PRBs (1, 2), and use QPSK with 1/2 coding. Candidate set 2 may have a resource size of 4 PRBs (3, 4, 5, 6), and use QPSK with 1/4 coding. A second wireless device may report a different capability to support data channel search space operation (e.g., more capable than the first wireless device) and may be configured with a PDSCH search space consisting of four sets of decoding candidates. For instance, candidate set 1 might utilize a resource size of 2 PRBs (1, 2) with QPSK and 1/2 coding, candidate set 2 might have a resource size of 4 PRBs (3, 4, 5, 6) with QPSK and 1/4 coding, candidate set 3 might have a resource size of 2 PRBs (11,12) with QPSK and 1/3 coding, and candidate set 4 might have a resource size of 4 PRBs (13, 14, 15, 16) with QPSK and 1/6 coding.

The data channel search space configuration provided by SS configuration component 725 may identify a location in the data channel that is to be monitored by the wireless device for control-free data transmissions and retransmissions. The location may comprise a frequency range, a collection of resource blocks, or other of time-frequency units to are to be monitored in the data channel. The data channel search space configuration may be signaled to the wireless device by base station 705 (via transmitter 720) when it attaches to a network and may be semi-persistent lasting as long as the association is maintained.

In some aspects, SS configuration component 725 prepares one or more RRC configuration messages to signal the data channel search space configuration. RRC messages may identify a PDSCH search region and/or UE-specific offsets for monitoring. For instance, base station 705 may send one or more RRC messages to a wireless device in which a frequency range of its PDSCH search space and its plurality of monitoring occasions are identified. The configuration may define a plurality of sets of decoding candidates and may indicate, for each set of decoding candidates, a corresponding frequency location within the data channel search space, resource size, modulation and coding scheme (MCS), or any combination thereof. Each set of decoding candidates may be associated with one or more of the monitoring occasions and each monitoring occasion may be associated with a particular data transmission from base station 705 (e.g., an initial data transmission, a first retransmission, a second retransmission, etc.). In another aspect, at least part of the data channel search space configuration may be provided via system information or other broadcast signals. For example, SS configuration component 725 may signal parts of the data channel search space configuration in system information block (SIB) messages and a wireless device may obtain device-specific information using one of its network identifiers, etc. The RRC configuration messages, system information, or broadcast signaling may be sent by base station 705 via transmitter 720.

Initial TX component 730 may be configured to generate initial data transmissions for a wireless device in accordance with the data channel search space configuration provided by SS configuration component 725. In some aspects, data channel resources for initial transmissions to the wireless device may be preconfigured. In that case, initial TX component 730 may be operative to prepare new data for transmission on such preconfigured resources during a monitoring occasion associated initial data transmissions to the wireless device. In other aspects, initial TX component 730 may be configured to select resources in a particular set of decoding candidates defined within the data channel search space for sending new data to the wireless device. The resources may be selected from a set of decoding candidates that is indicated in the data channel search space configuration as being used for initial data transmissions, but the wireless device does not know the particular resources on which the initial data transmission will be sent. With this approach, data channel resources can vary from one initial data transmission to the next providing scheduling flexibility for base station 705. Also, in accordance with the data channel search space configuration, resource sizes, modulation and coding, and frequency/PRB locations can vary for each set of decoding candidates. Thus, in some aspects, by selecting resources within different sets of decoding candidates, initial TX component 730 can vary these aspects of the initial data transmission as well.

Retransmission (ReTX) component 735 may be configured to manage the retransmission of initial data transmissions and to facilitate error correction through HARQ operation with link adaptation. In some aspects, ReTX component 735 is configured to select resources from one or more sets of decoding candidates in the data channel search space for a retransmission to a wireless device. The one or more sets of decoding candidates may be associated with a particular retransmission and may differ from the one or more sets of decoding candidates used for the initial data transmission. For example, SS configuration component 725 may establish a PDSCH search space configuration for a wireless device in which initial TX component 730 is configured to use either preconfigured resources or resources in a first set of decoding candidates for sending an initial data transmission from base station 705. The PDSCH search space configuration from SS configuration component 725 may define a second set of decoding candidates for use with one or more retransmissions of the initial data transmission which are controlled by ReTX component 735 and coincide with corresponding monitoring occasions. At least one of the frequency location, the resource size, or the MCS may differ between the first set of decoding candidates and the second set of decoding candidates such that link adaptation can occur between the initial data transmission and subsequent retransmissions. Also, ReTX component 735 can improve reliability by varying the coding rate and resource size across retransmissions. In one aspect, a larger resource size, a lower coding rate, or both, is used with the second set of decoding candidates than with the first set of decoding candidates to send a given amount of data as the number of retransmission increases.

Transmitter 720 may transmit signals generated by other components of base station 705. For example, transmitter 720 can transmit a slot or subframe having a data channel with data transmissions from initial TX component 730 and retransmissions from ReTX component 735, as configured by SS configuration component 725 of communications manager 715. In some designs, the transmitter 720 may be collocated with a receiver 710 in a transceiver module. For instance, the transmitter 720 may be an example of aspects of the transceiver 835 described with reference to FIG. 8. The transmitter 720 may include a single antenna, or it may include a set of antennas.

Figure 8:
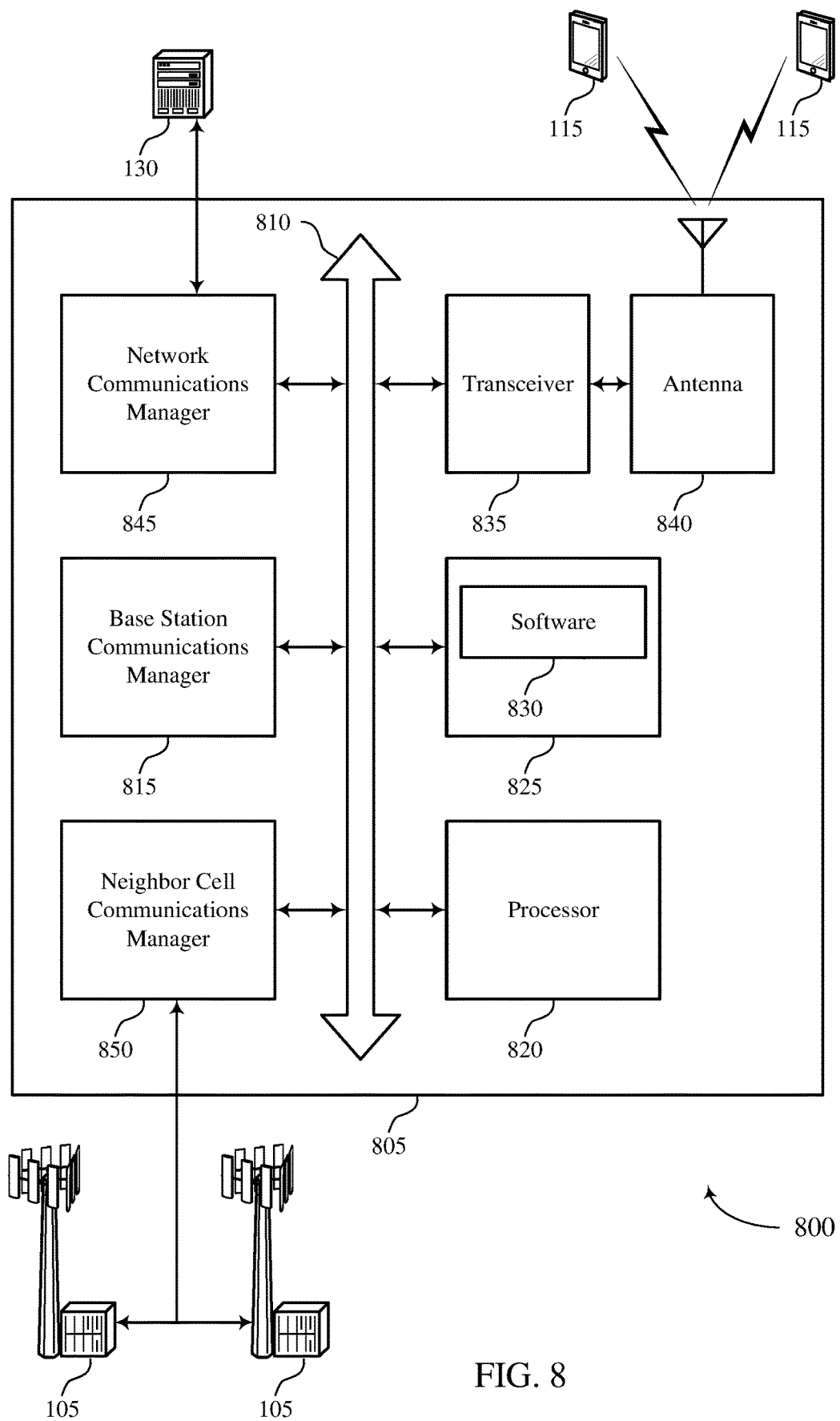

FIG. 8 shows a diagram of a system 800 including a wireless device 805 that supports data channel search space operation in accordance with various aspects of the present disclosure. For example, wireless device 805 may be an example of, or include the components of, base station 105, wireless device 605, or base station 705 as described above, e.g., with reference to FIGS. 1, 6, and 7. Wireless device 805 may include components for bi-directional voice and data communications including components for transmitting and receiving communications, including base station communications manager 815, processor 820, memory 825, software 830, transceiver 835, antenna 840, network communications manager 845, and backhaul communications manager 850. These components may be in electronic communication via one or more busses (e.g., bus 810). Wireless device 805 may communicate with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting search space for a decoder).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support search space for a decoder. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may form a communications interface of wireless device 805 and be operative for bi-directional communication, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device 805 may include a single antenna 840. However, in some cases it may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Neighbor cell communications manager 850 may manage communications with other base stations 105, and may include a controller or scheduler for controlling communications with UEs 115 in cooperation with other base stations 105. For example, the neighbor cell communications manager 850 may coordinate scheduling for transmissions to UEs 115 for various interference mitigation techniques such as beamforming or joint transmission. In some examples, neighbor cell communications manager 850 may provide an X2 interface within an Long Term Evolution (LTE)/LTE-A wireless communication network technology to provide communication between base stations 105.

Figure 9:
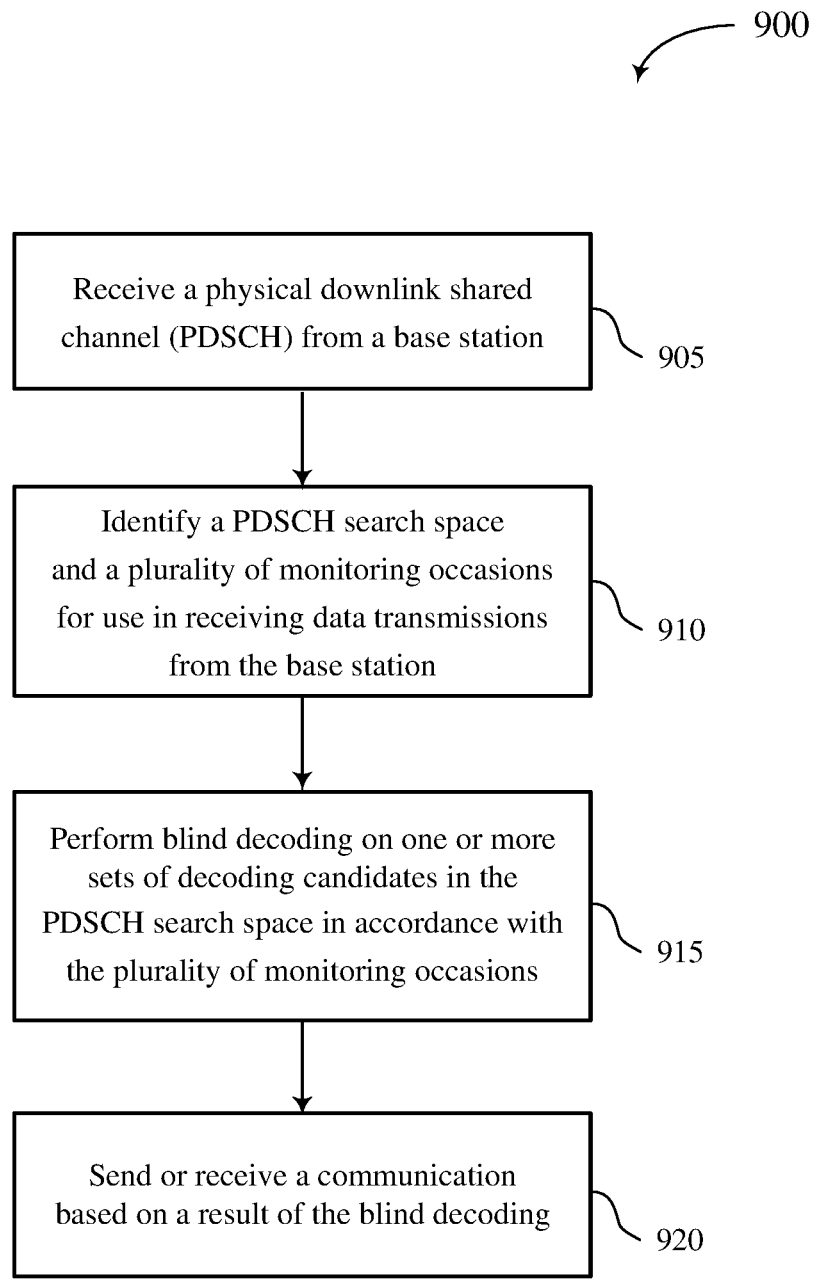
FIGS. 9-10 illustrate methods for wireless communication utilizing a data channel search space for initial data transmissions and retransmissions in accordance with aspects of the present disclosure.

FIG. 9 shows a flowchart illustrating a method 900 for wireless communication utilizing a data channel search space in accordance with various aspects of the present disclosure. The operations of method 900 may be implemented by a user equipment 115, a wireless device 305, 405, 505, or components thereof. For example, the operations of method 900 may be performed by a decoding manager as described with reference to FIGS. 3, 4, and 5. In some examples, a user equipment 115 or wireless device 305, 405, 505 may execute a set of codes to control the functional elements of the device to perform the functions described below. Additionally or alternatively, the user equipment 115 or wireless device 305, 405, 505 may perform aspects of the functions described below using special-purpose hardware.

In one aspect, the method 900 for wireless communication may be advantageously used in a factory automation or an industrial IoT (IIoT) environment. For example, the wireless device may control a piece of industrial equipment for which ultra-reliable, low latency communication of relatively small data packets is required. In such case, the base station may configure a data channel search space to avoid grant-based signaling on a control channel. For URLLC communication, control channel operation may be a reliability bottleneck due to the one-shot nature of control channel transmissions. Also, use of the data channel search space enables link adaptation across retransmissions. From a device complexity standpoint, use of the data channel search space may reduce the need for control channel monitoring and thus impose only modest additional requirements. Alternatively, use of the data channel search space can represent a tradeoff in which additional processing at the device is utilized to achieve more stringent latency and reliability targets.

At block 905, the wireless device may receive a physical downlink shared channel (PDSCH) from a base station. The wireless device may, at block 910, identify a data channel (PDSCH) search space and a plurality of monitoring occasions for receiving data transmissions from a base station. In one aspect, the wireless device receives a PDSCH search space configuration from the base station via RRC signaling. The PDSCH search space configuration may include a plurality of sets of decoding candidates and each set of decoding candidates may include resource locations at which the wireless device attempts to decode a transmission from the base station. Different sets of the decoding candidates may be associated with different data transmissions in corresponding monitoring occasions. In one aspect, the PDSCH search space configuration indicates a frequency location, a resource size, a modulation and coding scheme (MCS), or any combination thereof, for each set of decoding candidates in the PDSCH search space. In one aspect, the PDSCH search space configuration is based on capabilities reported to the network by the wireless device. The operations of block 905 may be performed by a decoding manger and a receiver as described with reference to FIGS. 3-5.

At block 915, the wireless device may perform blind decoding on one or more sets of decoding candidates in its PDSCH search space in accordance with the plurality of monitoring occasions. For instance, the plurality of sets of decoding candidates may include a first set of decoding candidates and a second set of decoding candidates. At least one of the resource size, the MCS, or both the resource size and the MCS, can differ between the first set of decoding candidates and the second set of decoding candidates. In one aspect, the first set of decoding candidates is configured for use with a first retransmission of an initial data transmission from the base station and the second set of decoding candidates is configured for use with a second retransmission the initial data transmission. In this arrangement, a larger resource size, a lower coding rate, or both, may be used with the second set of decoding candidates than with the first set of decoding candidates.

In one aspect, the wireless device monitors preconfigured resources in the PDSCH search space for an initial data transmission from the base station and performs blind decoding in one or more sets of decoding candidates for retransmissions. In another aspect, the wireless device performs blind decoding on a first set of decoding candidates in a first monitoring occasion associated with initial data transmissions from the base station and performs blind decoding on a second set of decoding candidates in a second monitoring occasion associated with retransmissions of the initial data transmissions. In one aspect, the size of data transmissions received from the base station in the data channel search space may be less than (or approximately equal to) 40 bytes. In an industrial IoT or factory automation setting, the wireless device may monitor the data channel search space for commands controlling operation of machinery and the wireless device may send data, such as sensor information, to the base station in support of such machinery. In certain examples, aspects of the operations of block 910 may be performed by a receiver and decoding manger as described with reference to FIGS. 3-5.

At block 920, the wireless device may send or receive a communication based on a result of the blind decoding. For example, if an initial data transmission is successfully decoded, or if a retransmission is decoded through soft combining with portions of the initial transmission and/or other retransmissions, the wireless device may send an ACK signal to the base station to indicate that further retransmissions are not needed. In some aspects, the wireless device may not send HARQ feedback after each transmission or retransmission, but may instead communicate with the base station after a predetermined number of monitoring occasions. For example, if the data transmission has not been successfully decoded after certain conditions are met, such as after a predetermined number of attempts or after a predetermined time duration, the wireless device may signal NACK to indicate a decoding failure. The base station may use such ACK/NACK feedback (or delayed ACK/NACK feedback) to modify the set of decoding candidates used for subsequent transmissions by, for instance, lowering the coding and modulation used to communicate with the wireless device when feedback from the wireless device indicates that a target error rate has been exceeded. In other aspects, the wireless device may send a communication unrelated to HARQ operation that is indicative of successful reception of the data transmission by the wireless device. In certain examples, aspects of the operations of block 915 may be performed by a decoding manger and a receiver as described with reference to FIGS. 3-5.

Figure 10:
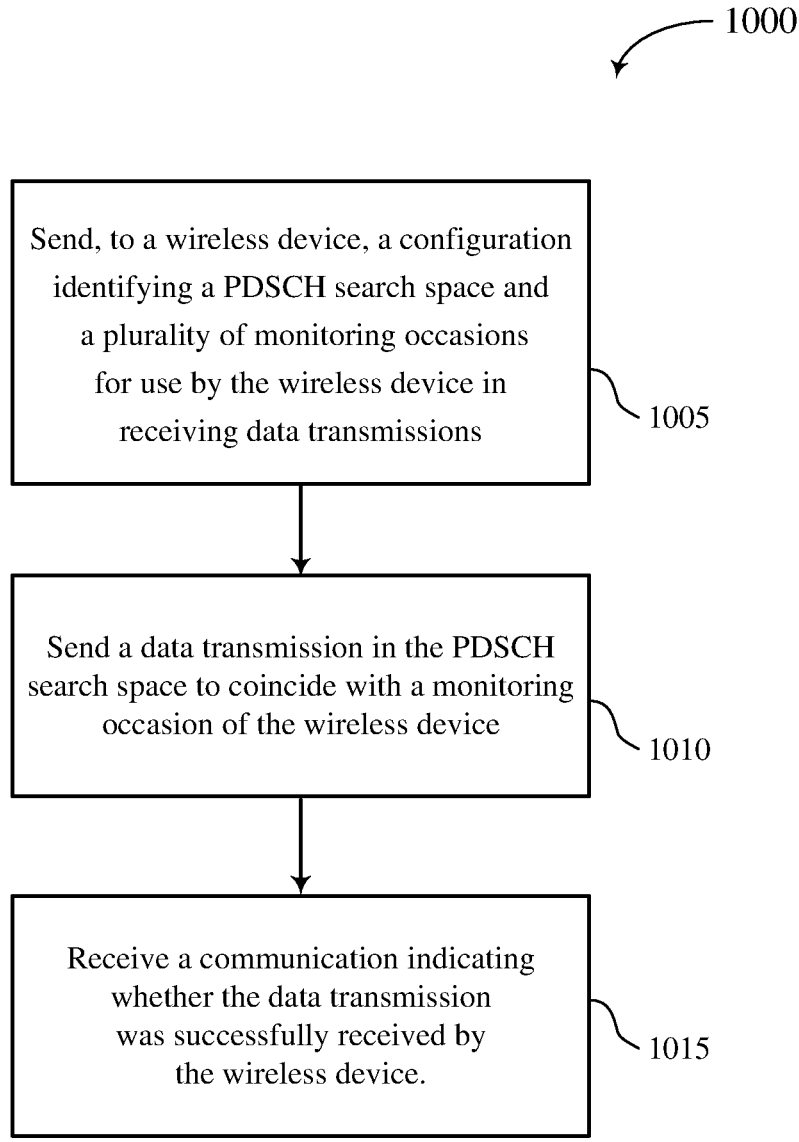

FIG. 10 shows a flowchart illustrating a method 1000 for wireless communication utilizing a data channel search space for initial data transmissions and retransmissions in accordance with various aspects of the present disclosure. The operations of method 1000 may be performed by a base station 105 or its components as described herein and may, in one aspect, be used advantageously in an industrial IoT or factory automation environment as described above. In one aspect, the operations of method 1000 may be performed by a base station communications manager as described with reference to FIGS. 6-8. In some examples, a base station 105 may execute a set of codes to control the functional elements of the device to perform the functions described below. Additionally or alternatively, the base station 105 may perform aspects of the functions described below using special-purpose hardware.

At block 1005, the base station may send, to a wireless device, a configuration identifying a PDSCH (data channel) search space and a plurality of monitoring occasions for use by the wireless device in receiving data transmissions from the base station. The PDSCH search space may include a plurality of sets of decoding candidates, and each set of decoding candidates may include a plurality of resources available to the base station for sending a data transmission to the wireless device. In one aspect, the base station sends the PDSCH search space configuration to the wireless device in one or more RRC configuration messages. In one aspect, the PDSCH search space configuration may be based on capabilities of the wireless device and reflect a limitation of the wireless device with respect to a number of decoding candidates, a resource size, or modulation and coding supported for data channel search space operation. In certain examples, aspects of the operations of block 1005 may be performed by a communication manager and a transmitter as described with reference to FIGS. 6-8.

At block 1010, the base station may send a data transmission in the PDSCH search space to coincide with a monitoring occasion of the wireless device. In one aspect, the configuration identifying the PDSCH search space identifies at least a first set of decoding candidates and a second set of decoding candidates. The frequency location, the resource size, the MCS, or a combination thereof, may differ between the first set of decoding candidates and the second set of decoding candidates. The first set of decoding candidates may be configured for use with a first retransmission of an initial data transmission from the base station and the second set of decoding candidates may be configured for use with a second retransmission the initial data transmission. A larger resource size, a lower coding rate, or both, may be used with the second set of decoding candidates than with the first set of decoding candidates.

In one aspect, the base station may send an initial data transmission to the wireless device on preconfigured resources of the PDSCH search space and may vary the set of decoding candidates and resource locations for retransmissions. In another aspect, the base station may send an initial data transmission to the wireless device on a first set of decoding candidates in the plurality of sets of decoding candidates of the PDSCH search space. The initial and retransmissions in the PDSCH search space may be timed to coincide with corresponding monitoring occasions configured for the wireless device. In certain examples, aspects of the operations of block 1010 may be performed by a communication manager and a transmitter as described with reference to FIGS. 6-8.

At block 1015, the base station may receive a communication from the wireless device indicating whether the data transmission was successfully received. In one aspect, the base station may receive a negative acknowledgement (NACK) from the wireless device (or the lack of a positive acknowledgment) and may send a retransmission of the data to the wireless device. In one aspect, the base station may receive a positive acknowledgement (ACK) and may discontinue any pending retransmissions of the data. In some aspects, the base station may infer successful or unsuccessful decoding based on application-level feedback. For example, in an industrial setting, if the base station commands a piece of factory equipment to move to a certain position, a camera or other sensor may be used to determine whether the equipment actually moved to the target position. In other words, in some aspects, feedback to the base station need not be received only in the form of ACK/NACK information for the communication link between the base station and a wireless device. Rather, such feedback be provided via other information exchange paths within the wireless communication system and may include uplink data transmissions that are indicative of successful or failed reception of a downlink transmission by a wireless device utilizing the PDSCH search space. In certain examples, aspects of the operations of block 1005 may be performed by a communication manager and a receiver as described with reference to FIGS. 6-8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication, comprising:
receiving, by a wireless device, a message indicating a configuration of a physical downlink shared channel (PDSCH) search space and a plurality of monitoring occasions, wherein the plurality of monitoring occasions are for receiving data transmissions from a base station, the data transmissions comprising data information that is different from control signaling carried on a control channel, and wherein the PDSCH search space comprises a plurality of sets of decoding candidates in the PDSCH on which the data transmissions may be received, the plurality of sets of decoding candidates comprising at least a first set of decoding candidates configured for use with an initial data transmission and a second set of decoding candidates configured for use with a retransmission of the initial data transmission;

performing blind decoding on at least one set of decoding candidates in the plurality of sets of decoding candidates at least based on the plurality of monitoring occasions and the configuration, wherein each of the at least one set of decoding candidates comprises a plurality of resource locations in the PDSCH search space at which the wireless device attempts to decode a data transmission of the data transmissions from the base station; and sending a communication to the base station based on a result of the blind decoding on the at least one set of decoding candidates in the PDSCH search space.

2. The method of claim 1, wherein the configuration of the PDSCH search space and the plurality of monitoring occasions indicates a frequency location, a resource size, a modulation and coding scheme (MCS), or any combination thereof, for each set of decoding candidates in the plurality of sets of decoding candidates.

3. The method of claim 1, wherein at least one of a frequency location, a resource size, a MCS, or a combination thereof, differs between the first set of decoding candidates and the second set of decoding candidates.

4. The method of claim 3, wherein a larger resource size, a lower coding rate, or both, is used with the second set of decoding candidates than with the first set of decoding candidates.

5. The method of claim 1, further comprising:
monitoring preconfigured resources in the PDSCH search space for the initial data transmission from the base station.

6. The method of claim 1, wherein performing blind decoding on at least one set of decoding candidates in the PDSCH search space comprises:
performing blind decoding on the first set of decoding candidates in a first monitoring occasion associated with initial data transmissions from the base station; and
performing blind decoding on the second set of decoding candidates in a second monitoring occasion associated with retransmissions of the initial data transmissions.

7. The method of claim 1, wherein performing blind decoding on at least one set of decoding candidates in the PDSCH search space comprises:
performing blind decoding on the first set of decoding candidates based on a first resource size and a first modulation and coding scheme (MCS), and
performing blind decoding on the second set of decoding candidates based on a second resource size and a second MCS.

8. The method of claim 1, further comprising reporting a capability of the wireless device to support the PDSCH search space, wherein identifying the PDSCH search space is based on the capability of the wireless device.

9. The method of claim 1, wherein a resource size of each decoding candidate in the PDSCH search space comprises an integer number of physical resource blocks (PRBs).

10. The method of claim 1, further comprising:
receiving the configuration via radio resource control (RRC) signaling from the base station.

11. The method of claim 1, wherein the data transmissions received from the base station in the PDSCH search space comprise less than 40 bytes of data.

12. The method of claim 1, wherein sending the communication comprises sending ACK/NACK feedback to the base station based on the result of the blind decoding on the at least one set of decoding candidates in the PDSCH search space.

13. A method of wireless communication performed by a base station, comprising:
sending, to a wireless device, a configuration identifying a physical downlink shared channel (PDSCH) search space in a PDSCH and a plurality of monitoring occasions, wherein the PDSCH search space comprises a plurality of sets of decoding candidates comprising at least a first set of decoding candidates configured for use with an initial data transmission by the base station and a second set of decoding candidates configured for use with a retransmission of the initial data transmission, each set of decoding candidates comprising a plurality of resources in the PDSCH search space available to the base station for sending data transmissions to the wireless device, the data transmissions comprising data information that is different from control signaling carried on a control channel;
sending, by the base station, a data transmission in the PDSCH search space to coincide with a monitoring occasion in the plurality of monitoring occasions, wherein resources of the PDSCH search space carry the data transmission from the base station to the wireless device; and
receiving a communication indicating whether the data transmission in the PDSCH search space was successfully received by the wireless device.

14. The method of claim 13, wherein the configuration identifying the PDSCH search space indicates a frequency location, a resource size, a modulation and coding scheme (MCS), or any combination thereof, for each set of decoding candidates in the plurality of sets of decoding candidates.

15. The method of claim 13, wherein the configuration identifying the PDSCH search space identifies at least the first set of decoding candidates and the second set of decoding candidates, and wherein a frequency location, a resource size, a MCS, or a combination thereof, differs between the first set of decoding candidates and the second set of decoding candidates.

16. The method of claim 15, wherein a larger resource size, a lower coding rate, or both, is used with the second set of decoding candidates than with the first set of decoding candidates.

17. The method of claim 13, wherein sending the data transmission comprises:
sending the initial data transmission to the wireless device on preconfigured resources of the PDSCH search space.

18. The method of claim 13, wherein sending the data transmission comprises:
sending the initial data transmission to the wireless device on the first set of decoding candidates in the plurality of sets of decoding candidates of the PDSCH search space;
receiving a negative acknowledgement from the wireless device; and
sending a retransmission of the initial data transmission to the wireless device on the second set of decoding candidates in the plurality of sets of decoding candidates of the PDSCH search space.

19. The method of claim 13, further comprising determining a capability of the wireless device to support the PDSCH search space, wherein the configuration is based on the capability of the wireless device.

20. An apparatus, comprising:
a processor;
memory coupled with the processor; and
instructions stored in the memory and operable, when executed by the processor, to cause the apparatus to:
receive a message indicating a configuration of a physical downlink shared channel (PDSCH) search space and a plurality of monitoring occasions, wherein the plurality of monitoring occasions are for receiving data transmissions from a base station, the data transmissions comprising data information that is different from control signaling carried on a control channel, and wherein the PDSCH search space comprises a plurality of sets of decoding candidates in the PDSCH on which the data transmissions may be received, the plurality of sets of decoding candidates comprising at least a first set of decoding candidates configured for use with an initial data transmission and a second set of decoding candidates configured for use with a retransmission of the initial data transmission;
perform blind decoding on at least one set of decoding candidates in the plurality of sets of decoding candidates at least based on the plurality of monitoring occasions and the configuration, wherein each of the at least one set of decoding candidates comprises a plurality of resource locations in the PDSCH search space at which the apparatus attempts to decode a data transmission of the data transmissions from the base station; and
send a communication to the base station based on a result of the blind decoding on the at least one set of decoding candidates in the PDSCH search space.

21. The apparatus of claim 20, wherein the configuration of the PDSCH search space and the plurality of monitoring occasions indicates a frequency location, a resource size, a modulation and coding scheme (MCS), or any combination thereof, for each set of decoding candidates in the plurality of sets of decoding candidates.

22. The apparatus of claim 20, wherein at least one of a frequency location, a resource size, a MCS, or a combination thereof, differs between the first set of decoding candidates and the second set of decoding candidates.

23. The apparatus of claim 22, wherein a larger resource size, a lower coding rate, or both, is used with the second set of decoding candidates than with the first set of decoding candidates.

24. The apparatus of claim 20, wherein the instructions are further operable to cause the apparatus to:
monitor preconfigured resources in the PDSCH search space for the initial data transmission from the base station.

25. The apparatus of claim 20, wherein the instructions are further operable to cause the apparatus to:
perform blind decoding on the first set of decoding candidates in a first monitoring occasion associated with initial data transmissions from the base station; and
perform blind decoding on the second set of decoding candidates in a second monitoring occasion associated with retransmissions of the initial data transmissions.

26. The apparatus of claim 20, wherein the instructions are further operable to cause the apparatus to:
perform blind decoding on the first set of decoding candidates based on a first resource size and a first modulation and coding scheme (MCS), and
perform blind decoding on the second set of decoding candidates based on a second resource size and a second MCS.

27. The apparatus of claim 20, wherein the instructions to send the communication are further operable to cause the apparatus to send ACK/NACK feedback to the base station based on the result of the blind decoding on the at least one set of decoding candidates in the PDSCH search space.

28. A base station, comprising:
a processor;
memory coupled with the processor; and
instructions stored in the memory and operable, when executed by the processor, to cause the base station to:
send, to a wireless device, a configuration identifying a physical downlink shared channel (PDSCH) search space in a PDSCH and a plurality of monitoring occasions, wherein the PDSCH search space comprises a plurality of sets of decoding candidates comprising at least a first set of decoding candidates configured for use with an initial data transmission by the base station and a second set of decoding candidates configured for use with a retransmission of the initial data transmission, each set of decoding candidates comprising a plurality of resources in the PDSCH search space available to the base station for sending data transmissions to the wireless device, the data transmissions comprising data information that is different from control signaling carried on a control channel;
send, by the base station, a data transmission in the PDSCH search space to coincide with a monitoring occasion in the plurality of monitoring occasions, wherein resources of the PDSCH search space carry the data transmission from the base station to the wireless device; and
receive a communication indicating whether the data transmission in the PDSCH search space was successfully received by the wireless device.

29. The base station of claim 28, wherein the configuration identifying the PDSCH search space indicates a frequency location, a resource size, a modulation and coding scheme (MCS), or any combination thereof, for each set of decoding candidates in the plurality of sets of decoding candidates.

30. The base station of claim 28, wherein the configuration identifying the PDSCH search space identifies at least the first set of decoding candidates and the second set of decoding candidates, and wherein a frequency location, a resource size, a MCS, or a combination thereof, differs between the first set of decoding candidates and the second set of decoding candidates.

31. The base station of claim 30, wherein a larger resource size, a lower coding rate, or both, is used with the second set of decoding candidates than with the first set of decoding candidates.

* * * * *